United States Patent
Dron et al.

(10) Patent No.: US 8,020,831 B2
(45) Date of Patent: Sep. 20, 2011

(54) SUSPENSION FOR SUSPENDING A TURBINE ENGINE FROM THE STRUCTURE OF AN AIRCRAFT

(75) Inventors: Sebastien Dron, Cachan (FR); Gilles Lucien Fontenoy, Livry sur Seine (FR); Marc Patrick Tesniere, Champcueil (FR)

(73) Assignee: SNECMA, Paris (FR)

( * ) Notice: Subject to any disclaimer, the term of this patent is extended or adjusted under 35 U.S.C. 154(b) by 600 days.

(21) Appl. No.: 12/145,848

(22) Filed: Jun. 25, 2008

(65) Prior Publication Data

US 2008/0315064 A1    Dec. 25, 2008

(30) Foreign Application Priority Data

Jun. 25, 2007   (FR) ...................... 07 04545

(51) Int. Cl.
*F16M 13/00*   (2006.01)

(52) U.S. Cl. ..... 248/554; 248/557; 248/571; 267/140.4; 267/141.1; 244/54

(58) Field of Classification Search ............... 248/559, 248/560, 556, 557, 562, 554, 571, 646, 564; 267/140.4, 141.1, 141.4, 293; 244/54
See application file for complete search history.

(56) References Cited

U.S. PATENT DOCUMENTS

| | | | | |
|---|---|---|---|---|
| 1,815,442 A | * | 7/1931 | Masury | 248/557 |
| 2,272,016 A | * | 2/1942 | Lytle | 248/557 |
| 2,317,190 A | * | 4/1943 | Henshaw | 248/556 |
| 2,365,421 A | * | 12/1944 | Lord | 248/556 |
| 4,899,323 A | * | 2/1990 | Fukahori et al. | 367/176 |
| 5,112,144 A | | 5/1992 | Law | |
| 5,176,339 A | * | 1/1993 | Schmidt | 244/54 |
| 5,351,930 A | * | 10/1994 | Gwinn et al. | 248/557 |
| 5,620,154 A | * | 4/1997 | Hey | 244/54 |
| 5,687,948 A | * | 11/1997 | Whiteford et al. | 248/635 |
| 5,769,380 A | * | 6/1998 | Hibi et al. | 267/141.2 |
| 6,330,995 B1 | * | 12/2001 | Mangeiga et al. | 248/554 |
| 6,986,482 B2 | * | 1/2006 | Brefort et al. | 244/54 |
| 7,461,815 B2 | * | 12/2008 | Almeras et al. | 244/54 |
| 7,566,029 B2 | * | 7/2009 | Dron et al. | 244/54 |
| 7,758,948 B2 | * | 7/2010 | Suzuki et al. | 428/139 |

FOREIGN PATENT DOCUMENTS

| | | |
|---|---|---|
| EP | 0 569 158 A2 | 11/1993 |
| EP | 0 583 158 A1 | 2/1994 |
| EP | 0 741 074 A1 | 11/1996 |
| EP | 0 872 418 A2 | 10/1998 |
| FR | 2 883 839 A1 | 10/2006 |

* cited by examiner

*Primary Examiner* — Terrell McKinnon
*Assistant Examiner* — Michael McDuffie
(74) *Attorney, Agent, or Firm* — Oblon, Spivak, McClelland, Maier & Neustadt, L.L.P.

(57) ABSTRACT

A suspension for suspending of a turbine engine from the structure of an aircraft using a beam with an attachment device which attaches to the structure and at least one link rod articulated via one end to a journal secured to the beam and via the other to a fitting secured to the turbine engine is disclosed. This suspension is one wherein the journal is mounted on the beam via a flexible coupling formed of two preloaded laminated, elastomer and metal, cylinders.

8 Claims, 2 Drawing Sheets

US 8,020,831 B2

SUSPENSION FOR SUSPENDING A TURBINE ENGINE FROM THE STRUCTURE OF AN AIRCRAFT

BACKGROUND OF THE INVENTION

The present invention relates to the suspending of a turbine engine from the structure of an airplane and is aimed more specifically at a means of attenuating vibrations between the engine and the bearing structure.

A turbine engine suspended, for example, from an airplane wing via a pylori comprises a forward hard point that reacts the loads passing through the intermediate casing in particular and a rear hard point at the exhaust casing. In a statically determinate suspension, the loads are transmitted via link rods suitably distributed between the two fastening components and which generally work in tension and in compression. The link rods are secured at one end to a beam secured to the structure of the airplane and at the other end to fittings on the engine casing or to the casing directly. The end attachments of the link rods used ball joints so that load can be transmitted only along the axis of these link rods. The loads reacted by these fasteners are the engine torque and the loads applied in the transverse plane of the engine such as the weight, lateral loads and engine thrust.

DESCRIPTION OF THE PRIOR ART

In order to reduce the vibrations introduced into the structure and the noise introduced into the cabin as a result of engine operation, it is known practice for vibration isolators to be introduced into the attachment systems. For example, patent EP 250659 describes a suspension for suspending a turbine engine from the structure of an airplane incorporating a transverse spindle between a beam from which the engine is suspended via link rods and the pylori under the wing of the airplane. The transverse spindle is supported by a first pair of isolators at its ends, working in vertical compression, and a second pair working in transverse compression. The two pairs are independent of one another and may have different coefficients of elasticity. This solution occupies a certain amount of space in the heightwise direction.

Other arrangements are known and are relatively complicated. These are generally applied to systems of the statically indeterminate type. This type of attachment has the chief disadvantage that the levels of load transmitted through the parts at any given moment are not known. This being the case, the isolators are harder to engineer with certainty.

SUMMARY OF THE INVENTION

It is an object of the present invention to produce a suspension for suspending a turbine engine in an aircraft structure that is both of the statically determinate type and incorporates a flexible vibration isolator, it being necessary for the unit to remain as compact as possible.

This objective is achieved with a suspension for suspending from the structure of an aircraft comprising a beam with means of attachment to said structure and at least one link rod articulated via one end to a journal secured to the beam and via the other to a fitting secured to the turbine engine, wherein said journal is mounted on the beam via a flexible coupling formed of two laminated cylinders combining layers of elastomer and of metal bonded together, supporting the journal at each end.

The load on the coupling is thus restricted to that exerted by one link rod. Further, as there are generally a number of link rods, this ensures that the load is spread. Furthermore, this arrangement makes it possible to know with certainty what path the loads are taking and the dimensions of the parts of the flexible coupling can be optimized.

In particular, the laminated cylinders comprise an annular rigid first armature secured to the journal, a second armature coaxial with the journal and a layer of elastomeric material between the two armatures, said elastomer layer being preloaded.

According to a preferred embodiment, the first and second armatures each have a frustoconical surface with the same axis as the journal, said preloaded layer being positioned between the two frustoconical surfaces.

More specifically, a flexible coupling means comprising a low number of parts is obtained, this at the same time being very compact with the rigid first armature of at least one of the two laminated cylinders mounted such that it can slide on the journal, compression being obtained by moving the first armature toward the second armature.

Advantageously, the frustoconical surfaces of the two laminated cylinders are symmetric with respect to the plane perpendicular to the journal passing through the link rod, and the two first armatures are slidably mounted on the journal. The elastomeric material is preloaded by moving the two first armatures toward one another.

BRIEF DESCRIPTION OF THE DRAWINGS

One nonlimiting embodiment of the invention is now described with reference to the drawings in which.

DESCRIPTION OF THE PREFERRED EMBODIMENT

Figure 1:
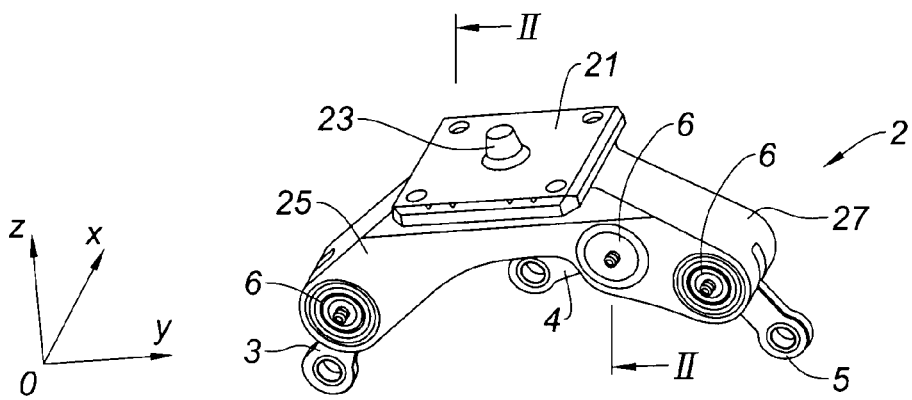
FIG. 1 shows one embodiment of a suspension according to the invention, viewed in perspective.

The suspension of FIG. 1 is made up of a beam 2 with an upper platform 21 in which holes have been drilled for the passage of fasteners such as bolts, not depicted, for attaching the beam to the structure of an aircraft. This structure may be a pylori for mounting under the wing, but the invention more generally covers attachment to any part of the aircraft. A central peg 23 reacts shear loads.

Figure 2:
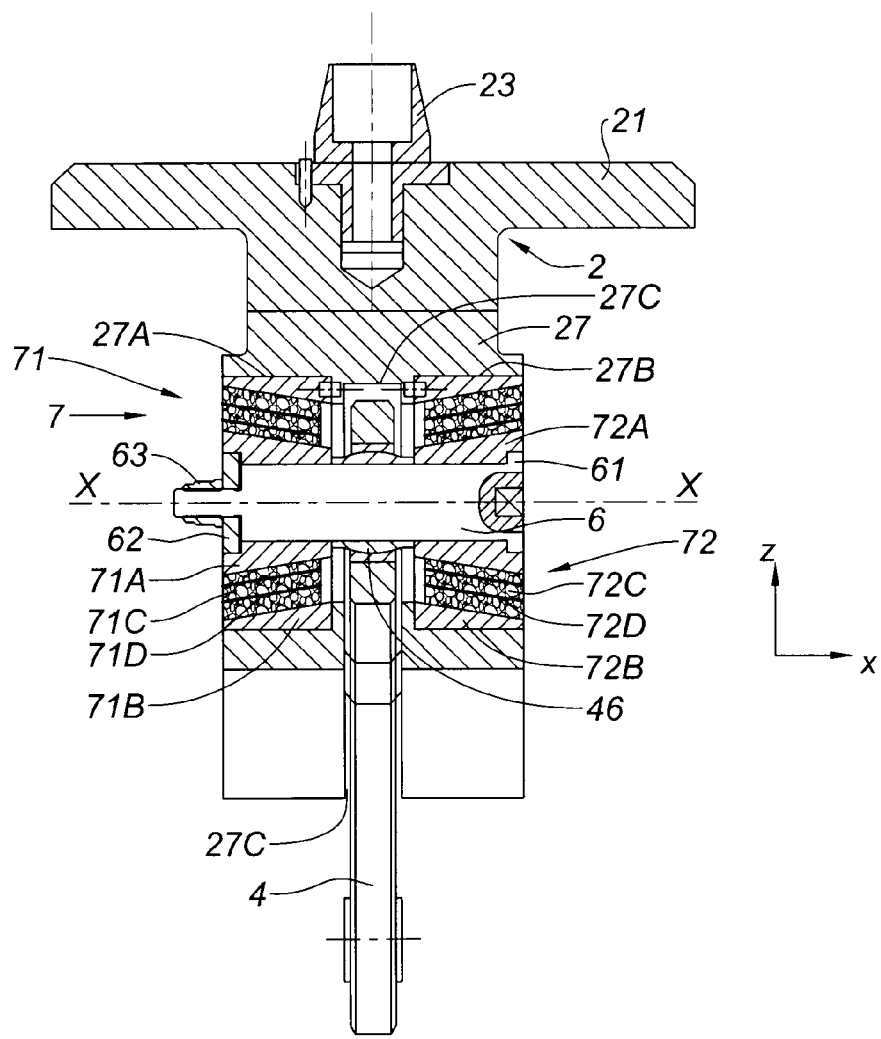
FIG. 2 is a view in section on II-II of the suspension of FIG. 1.

Connected to this platform are, in this instance, two arms 25 and 27 arranged in a V and on which the link rods 3, 4 and 5 are mounted. These link rods are articulated on journals 6 which are parallel to one another and mounted via flexible couplings in the arms 25 and 27. The beam may have a different structure or geometry; that depicted is nonlimiting. The free end of the link rods is holed for the passage of a fastener for attachment to the fitting of the engine casing, not depicted. Link rods in this instance are positioned in the transverse plane with respect to the axis of the engine. They may also be close to this plane. The two outer link rods 3 and 5 are connected to a transverse flange of the casing in such a way that the hard points form a trapezium. Because of the ball joint attachments, these two link rods transmit load along the axes 0Y and 0Z perpendicular to the axis of the engine. In this set-up, the purpose of the central link rod 4 is, in conjunction with the other link rods, to transmit loads associated with engine torque. The axis 0X in the frame of reference associated with FIG. 1 is the axis of the engine: the axis 0Z is the vertical axis and the axis 0Y is transverse. Reference is made to FIG. 2 which shows, in greater detail, the mounting of a link rod on the beam. This is the central link rod 4 but this method of mounting is valid also for the other two link rods 3 and 5. Two cylindrical housings 27A and 27B have been machined in the arm 27 according to this embodiment. The axis XX of these housings is perpendicular to the plane formed by the arms 25 and 27. These two housings are separated by a slot 27C which opens to the opposite side to the platform 21. The slot houses the link rod 4 and is wide enough to allow this link rod some freedom to travel within it. The link rod is articulated on a journal 6 of axis XX parallel to the engine axis via a ball-jointed bearing 46. This bearing allows the link rod to move about the axis XX mainly and about two further axes parallel to the axis XX; that is to say the transverse axis YY and the vertical axis ZZ. The movement permitted is within the limits of the clearance formed between the link rod 4 and the walls of the slot 27C.

According to the invention, a flexible coupling 7, the purpose of which is to damp out vibrations between the source that is the engine and the beam, connects the journal 6 to the arm 27. This flexible coupling consists of two laminated cylinders 71 and 72 comprising layers of elastomeric material alternating with rigid metal layers. The cylindrical elements are positioned in the housings 27A and 27B respectively. Each of the cylinders 71 and 72 comprises a rigid first armature, particularly one made of metal, 71A and 72A; a rigid second armature 71B and 72B, respectively, and, between these two, layers 71C, 72C of elastomeric material alternating as appropriate with one or more metal layers 71D, 72D. The cylinder may comprise just a single elastomeric layer between the two armatures, and therefore have no metal layer. This example depicts three elastomeric layers 71C, 72C and two metal layers 71D, 72D. All the layers are bonded to one another. Reference hereinafter is made to the elastomeric layer 71C, 72C. The first annular armature is mounted on the journal 6 and its external surface is frustoconical of axis XX. The second annular armature is wedged via its external surface into the housing 27A and also has a frustoconical surface, although this is an internal surface. The two conical surfaces have the same vortex angle and the same axis XX. Between them they form a space filled with the elastomeric layer. According to one feature of the invention, this layer is preloaded. This characteristic is obtained by moving the two frustoconical surfaces closer to one another along the axis XX. This compression allows the elastomer not to be subjected to any depression regardless of the relative movement of the journal with respect to the beam along any one of the axes XX, YY and ZZ.

The frustoconical shape has the advantage that the preload can be achieved easily. A preloaded cylindrical shape, although more difficult to produce, could also be conceivable.

Figure 3:
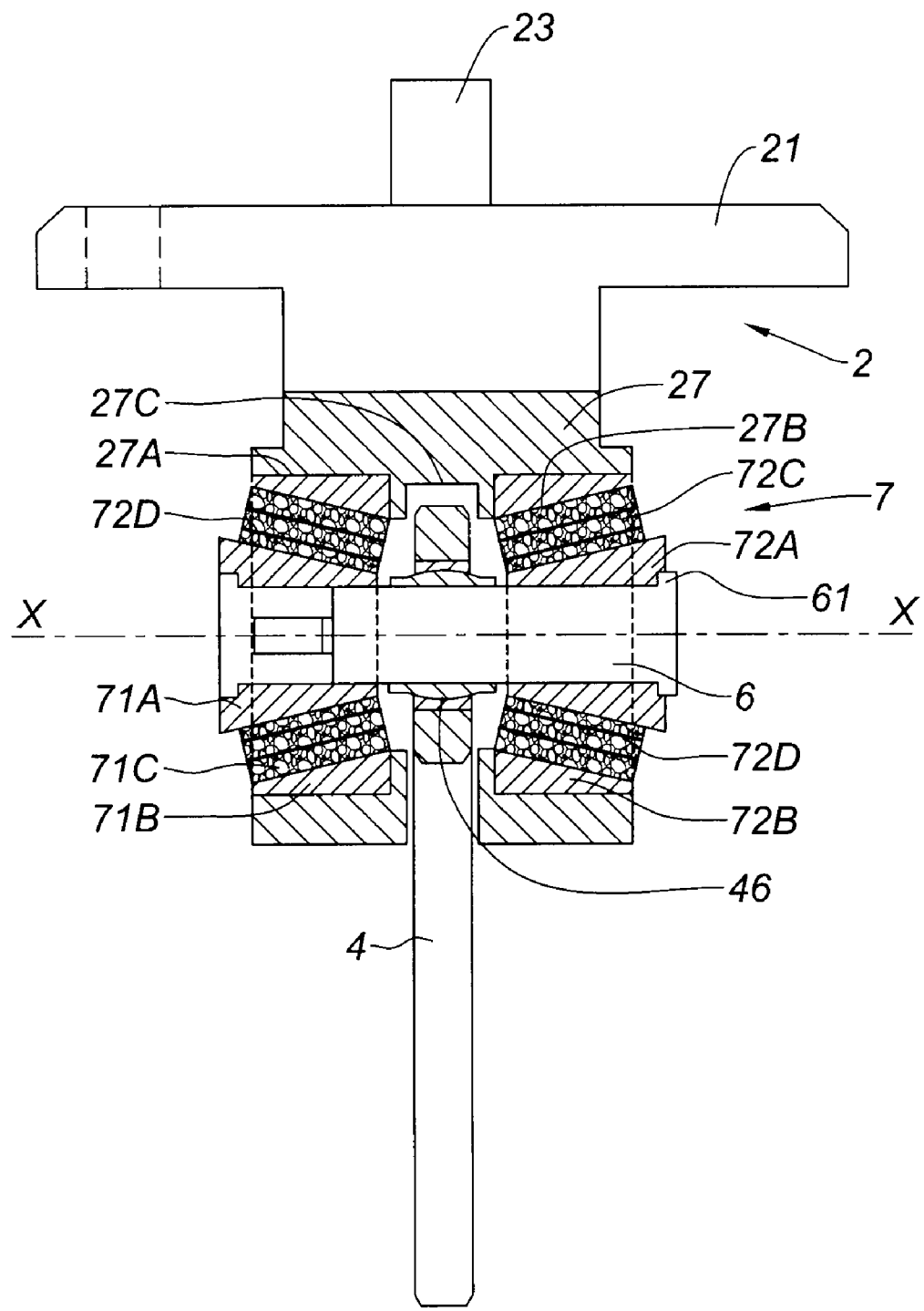
FIG. 3 shows a suspension of the invention while it is in the process of being assembled.

This arrangement is particularly simple to implement both in terms of the structure and in terms of the assembly of the suspension. As can be seen in FIG. 3, the two cylinders 71 and 72, prior to assembly, have their elastomeric layer 71C, 72C noncompressed, the two armatures being axially parted from one another because of the mobility of the first armature which is able to slide on the journal. Once the laminated cylinders 71, 72 have been fitted into their respective housings 27A and 27B, the link rod is positioned in the slot 27C then the journal 6 is inserted into the armature from one side until a shoulder 61 of the journal comes into abutment; a washer 62 is slipped onto the other end of the journal, which is threaded. A nut 63 is fitted onto the threaded part and tightened. FIG. 3 shows the assembled part prior to tightening. The two first armatures 71A and 72A are offset with respect to the second armatures 71B and 72B which are wedged in their respective housings 27A and 27B. By tightening the nut, the two washers are moved closer to one another carrying the two first armatures with them. It therefore follows that the elastomeric layer 71C and 72C between each first and second armature is subjected to axial compression.

The solution of the invention makes it possible to produce a flexible coupling between the journal and the beam through which the loads applied by the link rod to the journal pass.

The invention claimed is:

1. A suspension for suspending a turbine engine from the structure of an aircraft comprising:
   a beam with an attachment device which attaches to said structure; and
   at least one link rod articulated via a first end to a journal secured to the beam and via a second end to a fitting secured to the turbine engine,
   wherein said journal is mounted on the beam via a flexible coupling provided by first and second laminated, elastomer and metal, cylinders which support first and second ends of the journal, respectively, the first and second laminated cylinders are disposed in first and second cylindrical housings, respectively, and the link rod is provided between the first and second laminated cylinders in an axial direction,
   wherein each of the first and second laminated cylinders includes an annular first inner armature secured to the journal, a second outer armature with an outer surface abutting an inner surface of the cylindrical housing, and an elastomer layer provided between the first inner armature and the second outer armature, the first and second armatures are coaxial with the journal, and
   wherein an outer surface of the first inner armature is frustoconical and tapers from a first end to a second end closer to the link rod such that an outer diameter at the first end of the first inner armature is greater than an outer diameter at the second end of the first inner armature, and an inner surface of the second outer armature is frustoconical and tapers from a first end to a second end closer to the link rod such that an inner diameter at the first end of the second outer armature is greater than an inner diameter at the second end of the second outer armature such that the elastomer layer between the first and second armatures is preloaded by the first and second armatures.

2. The suspension as claimed in claim 1, wherein the first inner armature of at least one of the first and second laminated cylinders is slidably mounted on the journal, the preload being obtained by moving the first armature toward the second armature.

3. The suspension as claimed in claim 1, wherein the first and second laminated cylinders are symmetric with respect to the plane perpendicular to the journal passing through the link rod.

4. The suspension as claimed in claim 3, wherein the two first armatures are slidably mounted on the journal, the elastomeric material being preloaded by moving the two first armatures toward one another.

5. A turbine engine comprising a suspension as claimed in claim 1.

6. The suspension as claimed in claim 1, wherein the at least one link rod is articulated to the journal via a bearing.

7. The suspension as claimed in claim 1, wherein the first end of the journal is threaded and the second end of the journal includes a shoulder which abuts the first inner armature of the second laminated cylinder.

8. The suspension as claimed in claim 7, wherein a nut is threaded onto the first end of the journal and a washer is sandwiched between the nut and the first inner armature of the first laminated cylinder.

* * * * *

UNITED STATES PATENT AND TRADEMARK OFFICE
CERTIFICATE OF CORRECTION

| | | |
|---|---|---|
| PATENT NO. | : 8,020,831 B2 | Page 1 of 1 |
| APPLICATION NO. | : 12/145848 | |
| DATED | : September 20, 2011 | |
| INVENTOR(S) | : Sebastien Dron et al. | |

It is certified that error appears in the above-identified patent and that said Letters Patent is hereby corrected as shown below:

Column 1, line 12, change "pylori" to --pylon--;

Column 1, line 36, change "pylori" to --pylon--; and

Column 2, line 42, change "pylori" to --pylon--.

Signed and Sealed this

Thirteenth Day of December, 2011

David J. Kappos
*Director of the United States Patent and Trademark Office*